US008630233B2

(12) United States Patent
Kwon et al.

(10) Patent No.: US 8,630,233 B2
(45) Date of Patent: Jan. 14, 2014

(54) COMMUNICATION METHOD OF A VEHICULAR ACCESS POINT, A VEHICULAR USER EQUIPMENT, AND A MACRO BASE STATION

(75) Inventors: Tae Soo Kwon, Hwaseong-si (KR); Kyung Hun Jang, Suwon-si (JP); Jong Bu Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 13/033,993

(22) Filed: Feb. 24, 2011

(65) Prior Publication Data
US 2012/0087303 A1    Apr. 12, 2012

(30) Foreign Application Priority Data
Oct. 6, 2010    (KR) .................. 10-2010-0097331

(51) Int. Cl.
*G01R 31/08*    (2006.01)
(52) U.S. Cl.
USPC .............................................. 370/328
(58) Field of Classification Search
None
See application file for complete search history.

(56) References Cited

U.S. PATENT DOCUMENTS

| | | | |
|---|---|---|---|
| 2005/0288021 A1* | 12/2005 | Hunkeler | 455/436 |
| 2007/0097938 A1 | 5/2007 | Nylander et al. | |
| 2008/0045212 A1* | 2/2008 | Kim et al. | 455/435.1 |
| 2009/0196266 A1 | 8/2009 | Wu et al. | |
| 2010/0260042 A1* | 10/2010 | Kwon et al. | 370/227 |
| 2012/0039248 A1* | 2/2012 | Schneider et al. | 370/328 |
| 2012/0151207 A1* | 6/2012 | Zhao et al. | 713/156 |

FOREIGN PATENT DOCUMENTS

| | | |
|---|---|---|
| JP | 2009-303223 | 12/2009 |
| KR | 10-2009-0008055 | 1/2009 |
| KR | 10-2009-0037199 | 4/2009 |
| KR | 10-2009-0112337 | 10/2009 |
| KR | 10-2010-0033702 | 3/2010 |

* cited by examiner

Primary Examiner — John Blanton
(74) Attorney, Agent, or Firm — NSIP Law

(57) ABSTRACT

Provided is a communication method of a vehicular access point, a vehicular user equipment, and a macro base station for a user present in a vehicle capable of effectively forming an operational relationship between the vehicular access point and the macro base station using a plurality of operational modes. The plurality of operational modes may be differentiated based on an operation of the vehicular access point and the macro base station, and are capable of transitioning the vehicular access point from an active state to an idle state by a triggering with respect to the vehicular access point.

23 Claims, 14 Drawing Sheets

COMMUNICATION METHOD OF A VEHICULAR ACCESS POINT, A VEHICULAR USER EQUIPMENT, AND A MACRO BASE STATION

CROSS-REFERENCE TO RELATED APPLICATION(S)

This application claims the benefit under 35 U.S.C. §119 (a) of Korean Patent Application No. 10-2010-0097331, filed on Oct. 6, 2010, in the Korean Intellectual Property Office, the entire disclosure of which is incorporated herein by reference for all purposes.

BACKGROUND

1. Field

The following description relates to a communication method of a vehicular access point, a vehicular user equipment, and a macro base station for a user in a vehicle.

2. Description of Related Art

Wireless Internet service may be used by users while riding in various types of transport means including a vehicle. For example, the transport means may be in motion or the transport means may be stopped. A user riding a vehicle, in a relatively stationary state, may desire high capacity wireless Internet.

Accordingly, there is a desire for a scheme of improving a communication capacity and other services with respect to a user riding in a vehicle.

SUMMARY

In one general aspect, there is provided a communication method of a vehicular access point, the communication method comprising broadcasting, to a vehicular user equipment, information about whether the vehicular access point exists, and information about at least one operational mode from among a plurality of operational modes of the vehicular access point and a macro base station that is proximate to the vehicular access point, and serving the vehicular user equipment based on the at least one operational mode, wherein the plurality of operational modes are differentiated from each other based on an operation that the macro base station performs for the vehicular user equipment, while the vehicular access point serves the vehicular user equipment.

The information about whether the vehicular access point exists may include an identifier (ID) of the vehicular access point, and the information about the at least one operational mode may correspond to a higher order message of the information about whether the vehicular access point exists.

The plurality of operational modes may include at least one of a first mode in which the macro base station releases a link between the macro base station and the vehicular user equipment while the vehicular access point exchanges data with the vehicular user equipment, a second mode in which the macro base station manages context of the vehicular user equipment while the vehicular access point exchanges data with the vehicular user equipment, a third mode in which the macro base station transmits and receives control information about the vehicular user equipment while the vehicular access point exchanges data with the vehicular user equipment, and a fourth mode in which the macro base station exchanges collaboration data with the vehicular user equipment while the vehicular access point exchanges collaboration data with the vehicular user equipment.

The vehicular access point may include a first wireless access device for a link between the macro base station and the vehicular access point, and a second wireless access device for a link between the vehicular user equipment and the vehicular access point.

The communication method may further comprise performing triggering with respect to the vehicular access point using at least one of a first link between the macro base station and the vehicular user equipment, a second link between the vehicular access point and the vehicular user equipment, and a signal of a third wireless access device connected to the vehicular user equipment, and activating the vehicular access point according to the triggering.

The triggering with respect to the vehicular access point may be performed using at least one of a scheme of triggering the vehicular access point by broadcasting, to the vehicular user equipment in the first link, a preamble group in an idle state at an interval of a transmission period of a preamble received from the macro base station, a scheme of triggering the vehicular access point using information about a received power variation of a preamble in the idle state received by the vehicular user equipment in the second link, and a scheme of triggering the vehicular access point using the signal of the third wireless access device connected to the vehicular user equipment.

The activating with respect to the vehicular access point may be performed using at least one of a first activating scheme of performing an activating operation by the vehicular access point according to a signal received from the macro base station, a second activating scheme of performing an activating operation by the vehicular access point when the vehicular access point recognizes the vehicular user equipment, and a third activating scheme of activating the vehicular access point by a paging performed by the macro base station receiving, from the vehicular user equipment, information about whether the vehicular access point exists, and information about a recognition of the vehicular access point.

When the vehicular user equipment desires to release a connection between the vehicular user equipment and the vehicular access point, the method may further comprise transmitting, to the vehicular user equipment, information including a tracking ID to which the vehicular access point belongs, and transmitting information about the vehicular user equipment to the macro base station corresponding to the tracking ID when a verification with respect to the release is received from the vehicular user equipment.

In another aspect, there is provided a communication method of a vehicular user equipment in a vehicle, the communication method comprising receiving, from a vehicular access point, information about whether the vehicular access point exists, and information about at least one operational mode from among a plurality of operational modes of the vehicular access point and a macro base station that is proximate to the vehicular access point, recognizing the at least one operational mode, and operating according to the at least one operational mode, wherein the plurality of operational modes are differentiated from each other based on an operation that the macro base station performs for the vehicular user equipment, while the vehicular access point serves the vehicular user equipment.

The information about whether the vehicular access point exists may include an identifier (ID) of the vehicular access point, and the information about the at least one operational mode may correspond to a higher order message of the information about whether the vehicular access point exists.

The plurality of operational modes may include at least one of a first mode in which the macro base station releases a link between the macro base station and the vehicular user equipment while the vehicular access point exchanges data with the vehicular user equipment, a second mode in which the macro base station manages context of the vehicular user equipment while the vehicular access point exchanges data with the vehicular user equipment, a third mode in which the macro base station transmits and receives control information about the vehicular user equipment while the vehicular access point exchanges data with the vehicular user equipment, and a fourth mode in which the macro base station exchanges collaboration data with the vehicular user equipment while the vehicular access point exchanges collaboration data with the vehicular user equipment.

The communication method may further comprise performing triggering with respect to the vehicular access point using at least one of a first link between the macro base station and the vehicular user equipment, a second link between the vehicular access point and the vehicular user equipment, and a signal of a third wireless access device connected to the vehicular user equipment, and activating the vehicular access point according to the triggering.

The triggering with respect to the vehicular access point may be performed using at least one of a scheme of triggering the vehicular access point by broadcasting, to the vehicular user equipment in the first link, a preamble group in an idle state at an interval of a transmission period of a preamble received from the macro base station, a scheme of triggering the vehicular access point using information about a received power variation of a preamble in the idle state received by the vehicular user equipment in the second link, and a scheme of triggering the vehicular access point using the signal of the third wireless access device connected to the vehicular user equipment.

The activating may perform the activating with respect to the vehicular access point by an upstream signal transmitted to the vehicular access point, or a paging of the macro base station receiving the information about whether the vehicular access point exists and information associated with a recognition of the vehicular access point.

In another aspect, there is provided a communication method of a macro base station in a vehicle, the communication method comprising recognizing a plurality of operational modes of a vehicular access point and a macro base station proximate to the vehicular access point, and operating according to the at least one operational mode when the vehicular access point broadcasts, to the vehicular user equipment, information about at least one operational mode from among the plurality of operational modes, wherein the plurality of operational modes are differentiated from each other based on an operation that the macro base station performs for the vehicular user equipment, while the vehicular access point serves the vehicular user equipment.

The plurality of operational modes may include at least one of a first mode in which the macro base station releases a link between the macro base station and the vehicular user equipment while the vehicular access point exchanges data with the vehicular user equipment, a second mode in which the macro base station manages context of the vehicular user equipment while the vehicular access point exchanges data with the vehicular user equipment, a third mode in which the macro base station transmits and receives control information about the vehicular user equipment while the vehicular access point exchanges data with the vehicular user equipment, and a fourth mode in which the macro base station exchanges collaboration data with the vehicular user equipment while the vehicular access point exchanges collaboration data with the vehicular user equipment.

The communication method may further comprise verifying whether activation of the vehicular access point is possible by a signal received from the vehicular user equipment or the vehicular access point, after a triggering of the vehicular access point performed by the vehicular access point and the vehicular user equipment is performed, and performing an operation for activating the vehicular access point depending on whether the activation of the vehicular access point is possible.

The signal received from the vehicular user equipment may correspond to a signal including information about whether the vehicular access point exists and information associated with a recognition of the vehicular access point, and the verifying whether the activation of the vehicular access point is possible may include verifying whether the activation of vehicular access point is possible using the information associated with the recognition of the vehicular access point, and performing a paging with respect to the vehicular access point.

The communication method may further comprise, when the vehicular user equipment desires to release a connection between the vehicular user equipment and the vehicular access point, receiving information about the vehicular user equipment from the vehicular access point transmitting, to the vehicular user equipment, information including a tracking ID to which the vehicular access point belongs.

In another aspect, there is provided a computer-readable storage medium having stored therein program instructions to cause a processor to implement a communication method, the communication method comprising broadcasting, to a vehicular user equipment, information about whether the vehicular access point exists, and information about at least one operational mode from among a plurality of operational modes of the vehicular access point and a macro base station that is proximate to the vehicular access point, and serving the vehicular user equipment based on the at least one operational mode, wherein the plurality of operational modes are differentiated from each other based on an operation that the macro base station performs for the vehicular user equipment, while the vehicular access point serves the vehicular user equipment.

In another aspect, there is provided a vehicular user equipment for determining the location, the vehicular user equipment comprising a receiver configured to receive a preamble signal from a macro base station that serves a vehicular access point, and a controller configured to determine whether the vehicular user equipment is located in the vehicle that comprises the vehicular access point, based on the power of the preamble signal received from the macro base station.

If the power of the preamble signal received from the macro base station is relatively constant, the controller may determine that the vehicular user equipment is present in the vehicle that comprises the vehicular access point.

If the power of the preamble signal received from the macro base station rapidly increases or decreases, the controller may determine that the vehicular user equipment is not present in the vehicle that comprises the vehicular access point.

Other features and aspects will be apparent from the following detailed description, the drawings, and the claims.

Figure 1:
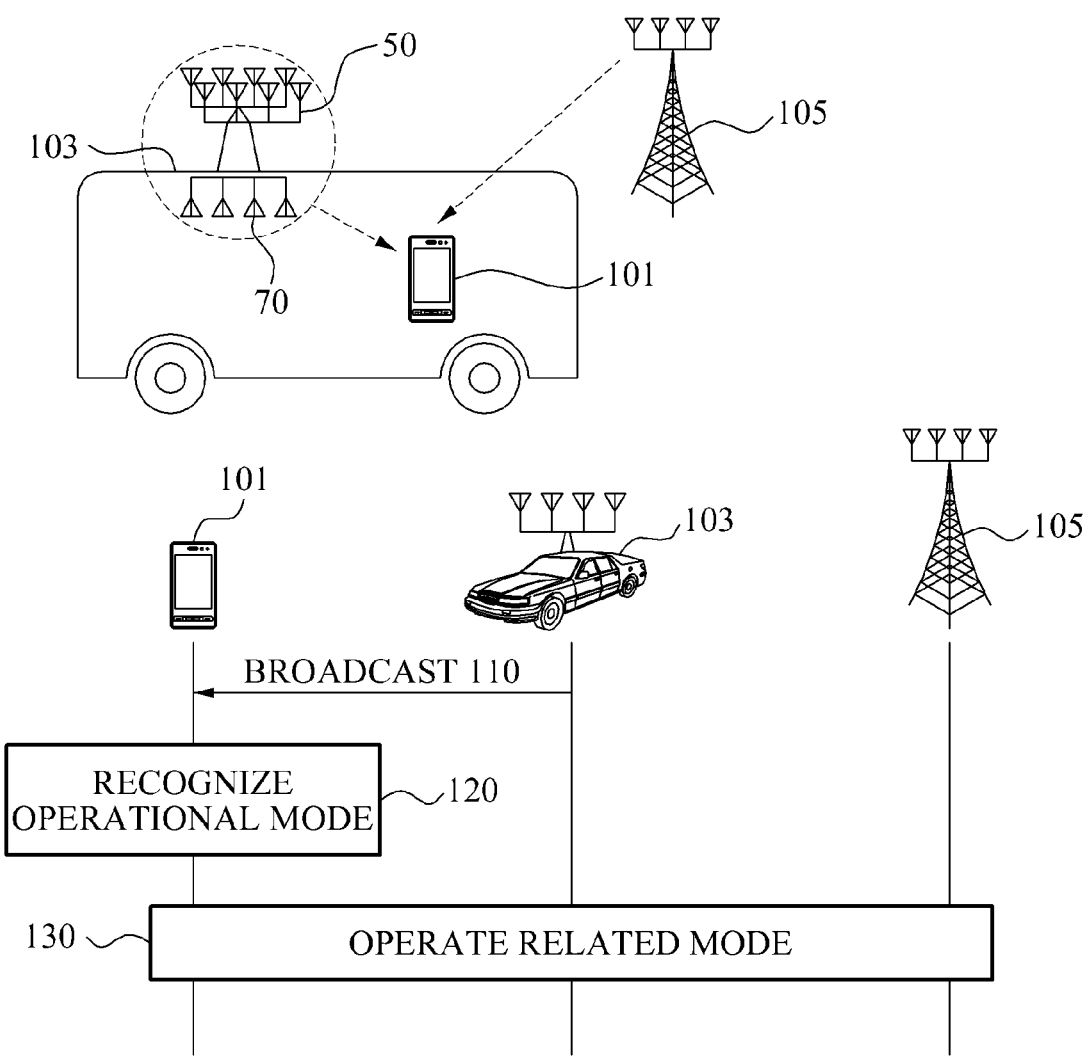
FIG. 1 is a diagram illustrating an example of an operational relationship between a vehicular user equipment, a vehicular access point, and a macro base station.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Hereinafter, a "vehicular user equipment" may refer to a communication device included in a vehicle, a communication device belonging to a user that is riding in the vehicle, and other user equipments capable of performing a similar function. For example, the vehicular user equipment may include a cellular phone, a mobile terminal, a personal computer, a smart phone attached to the vehicle, and the like, in addition to various user equipments such as the cellular phone, the personal computer, the smart phone, a laptop computer, and the like belonging to the user that is riding in the vehicle.

A "vehicular access point" may provide a communication service to the user that is riding in the vehicle, and may be installed in the vehicle. The vehicular access point may include a plurality of wireless access devices forming a link with each of a macro base station and the vehicular user equipment. For example, the vehicular access point may improve a quality of a wireless communication, and may relay the transmission and the reception of data between the macro base station and the vehicular user equipment, and/or may perform a cooperative communication with other communication devices.

When the user of the vehicular user equipment accesses the wireless access device of the vehicular access point included in the vehicle, situations below may be considered based on a connection state between the vehicular user equipment and the vehicular access point.

The first situation corresponds to an example in which the connection between the vehicular user equipment and the vehicular access point is initiated. For example, when the connection between the vehicular user equipment and the vehicular access point is initiated, and the vehicular access point is in an idle state, the macro base station may detect an activity of the vehicular user equipment to activate the vehicular access point.

For example, when the connection is initiated, and the vehicular access point is in an active state, each of the vehicular access point and the macro base station may form an interoperation relationship between the vehicular access point and the macro base station.

The second situation corresponds to an example in which the connection between the vehicular user equipment and the vehicular access point is released. In this example, the vehicular user equipment may transition to the idle state.

For example, when both of an internal wireless access device and an external wireless access device of the vehicular access point correspond to the cellular system, the vehicular user equipment may periodically broadcast a tracking identifier (ID) to the vehicular user equipment, and the vehicular user equipment may manage a mobility using a scheme similar to a general scheme.

As another example, when the internal wireless access device of the vehicular access point does not correspond to the cellular system and corresponds to, for example, a wireless local area network (WLAN), a location of the vehicular access point may change. Thus, the vehicular access point may not broadcast the tracking ID to the vehicular user equipment.

Accordingly, the vehicular access point may register the context of the vehicular user equipment in the macro base station, to hand over the vehicular user equipment to the macro base station.

An operational relationship among the vehicular user equipment, the vehicular access point, and the macro base station performing operations used depending on the above-described situations are described with reference to FIG. 1.

FIG. 1 illustrates an example of an operational relationship between a vehicular user equipment, a vehicular access point, and a macro base station.

Referring to FIG. 1, a network configured for a user present in a vehicle includes a vehicular user equipment 101, a vehicular access point 103, and a macro base station 105.

The vehicular user equipment 101 may refer to a terminal in the vehicle which is capable of communicating with another device, a communication terminal belonging to a user that is riding in the vehicle, and other user equipments capable of performing a similar function.

The vehicular access point 103 may provide a communication service to the user present in the vehicle, for example, the vehicular user equipment 101, and may be installed in the vehicle. For example, the vehicular access point 103 may include a first wireless access device 50 for a link between the macro base station 105 and the vehicular access point 103, and a second wireless access device 70 for a link between the vehicular user equipment 101 and the vehicular access point 103.

The vehicular access point 103 may connect to the macro base station 105 through the first wireless access device 50 and the second wireless access device 70 to provide a high capacity wireless link to the user that is present in the vehicle, for example, the vehicular user equipment 101.

When the vehicular access point 103 provides the vehicular user equipment 101 with a data transmission and reception service, the vehicular access point 103 and the macro base station 105 may select various transmission and reception schemes as shown in the following Table 1.

TABLE 1

|  | Operation of the vehicular access point 103 | Operation of the macro base station 105 |
| --- | --- | --- |
| First mode | Transmit and receive data | Release link |
| Second mode | Transmit and receive data | Manage context of vehicular user equipment |
| Third mode | Transmit and receive data | Transmit and receive only control information |
| Fourth mode | Transmit and receive collaboration data | Transmit and receive collaboration data |

For example, an operation of informing vehicular user equipment 101 of the various types of transmission and reception schemes may be used, and the operation may be performed by the example described below.

In 110, the vehicular access point 103 broadcasts, to the vehicular user equipment 101, information about whether the vehicular access point 103 exists, and information about at least one operational mode from among a plurality of operational modes of the vehicular access point 103 and the macro base station 105 that is proximate to the vehicular access point 103.

As illustrated in Table 1, the plurality of operational modes may be differentiated from each other based on an operation that the macro base station 105 performs for the vehicular user equipment 101, while the vehicular access point 103 serves the vehicular user equipment 101.

For example, the plurality of operational modes may include at least one of the first mode in which the macro base station 105 releases a link between the macro base station 105 and the vehicular user equipment 101 while the vehicular access point 103 exchanges data with the vehicular user equipment 101, the second mode in which the macro base station 105 manages a context of the vehicular user equipment 101 while the vehicular access point 103 exchanges data with the vehicular user equipment 101, the third mode in which the macro base station 105 exchanges control information about the vehicular user equipment 101 while the vehicular access point 103 exchanges data with the vehicular user equipment 101, and the fourth mode in which the macro base station 105 exchanges collaboration data with the vehicular user equipment 101 while the vehicular access point 103 exchanges collaboration data with the vehicular user equipment 101.

For example, the information about whether the vehicular access point 103 exists may include an ID of the vehicular access point 103, and the information about at least one operational mode may correspond to a higher order message of the information about whether the vehicular access point 103 exists.

In 120, the vehicular user equipment 101 recognizes the at least one operational mode through the broadcast.

In 130, when the vehicular user equipment 101 recognizes the at least one operational mode, the vehicular access point 103 may serve the vehicular user equipment 101 according to a corresponding operational mode, and the macro base station 105 may operate according to a corresponding operational mode.

Prior to 130, the vehicular user equipment 101 and the vehicular access point 103 may determine a transmission and reception option with respect to each other. As another example, prior to 130 the vehicular access point 103 and the macro base station 105 may determine the transmission and reception option with respect to the corresponding vehicular user equipment 101.

When the link between the vehicular user equipment 101 and the vehicular access point 103 corresponds to a non-cellular system, for example, a WLAN, the link between the macro base station 105 and the vehicular user equipment 101 may be released while the vehicular user equipment 101 communicates with the vehicular access point 103 using the link between the vehicular user equipment 101 and the vehicular access point 103.

For example, the macro base station 105 may not manage whether the vehicular user equipment 101 exists and corresponding related information. When the vehicular user equipment 101 present in the vehicle is handed over to the macro base station 105 again, a delayed time due to a separate processing of a registering procedure with respect to the macro base station 105 and a core net and due to a registering procedure may be used.

To solve the problem of using the delayed time, the vehicular access point 103 may use a scheme for registering the context of the vehicular user equipment 101 in the macro base station 105 corresponding to the above-mentioned second mode. The second mode scheme is further described with reference to FIG. 2 and FIG. 3.

Figure 2:
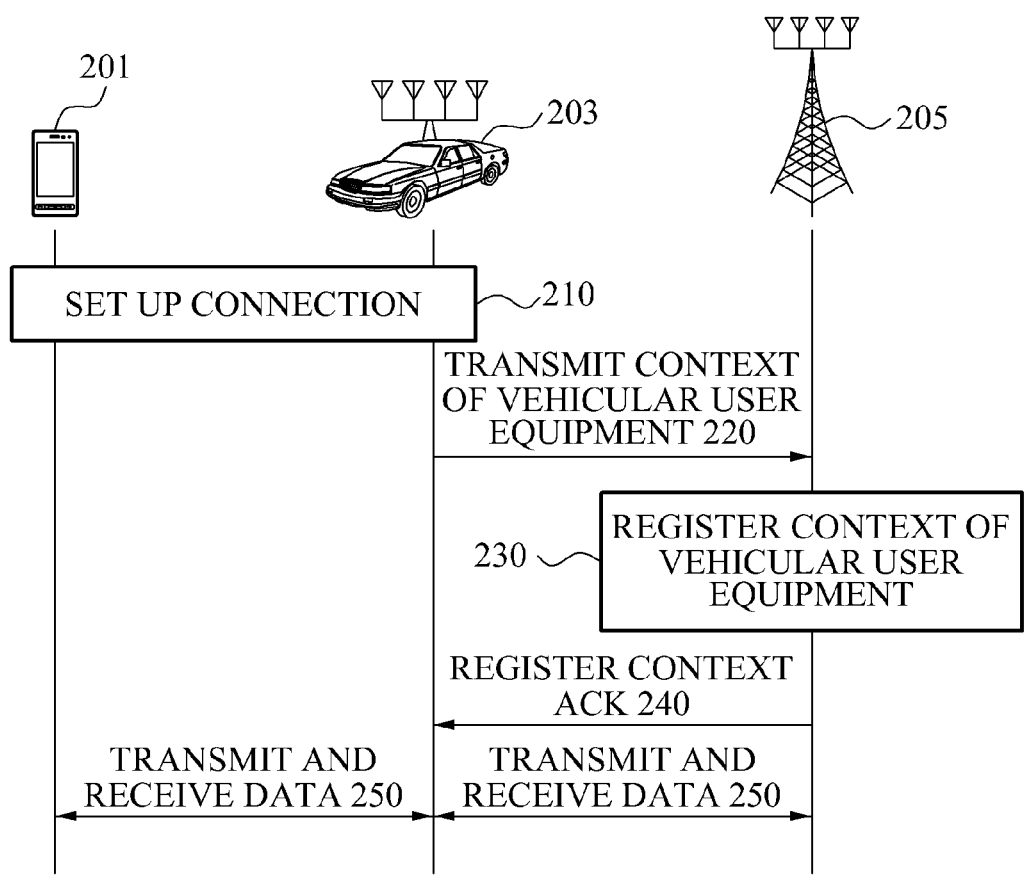
FIG. 2 is a diagram illustrating an example of a scheme in which a vehicular access point registers context of a vehicular user equipment in a macro base station.

FIG. 2 illustrates an example of a scheme in which a vehicular access point registers a context of a vehicular user equipment in a macro base station.

Referring to FIG. 2, in 210, to register the context of a vehicular user equipment 201 in a macro base station 205, a vehicular access point 203 sets up a connection between the vehicular user equipment 201 and the vehicular access point 203.

During the set-up of the connection in 210, when the vehicular access point 203 is in an active state, the vehicular user equipment 201 may initially access the vehicular access point 203.

In an example in which the vehicular access point 203 is in an idle state, the vehicular user equipment 201 may initially access the macro base station 205, and then may access the vehicular access point 203 when the vehicular access point 203 is activated. When the vehicular access point 203 is in the idle state, the vehicular user equipment 201 may wait for the vehicular access point 203 to be activated, and may access the vehicular access point 203 when the vehicular access point 203 is activated.

In this example, the vehicular user equipment 201 may correspond to a terminal handed over from the macro base station 205 to the vehicular access point 203.

In 220, the vehicular access point 203 transmits the context of the vehicular user equipment 201 to the macro base station 205. When the vehicular user equipment 201 accesses the macro base station 205 first, and is then handed over to the vehicular access point 203, the macro base station 205 may independently update the context of the corresponding vehicular user equipment 201.

The context of the vehicular user equipment 201 may include various types of information, for example, an address of the vehicular user equipment 201, a quality of service (QoS) with respect to the vehicular user equipment 201, a profile of the vehicular user equipment 201, and the like. The context of the vehicular user equipment 201 may have different protocol due to an address mapping between orders in a convergence sub-layer.

After the macro base station 205 registers the context of the vehicular user equipment 201 in 230, the macro base station 205 transmits, to the vehicular access point 203, an acknowledge (ACK) signal reporting that the corresponding context is registered, in 240.

In 250, the vehicular user equipment 201 and the vehicular access point 203 may exchange data through a link between the vehicular user equipment 201 and the vehicular access point 203, and the vehicular access point 203 and the macro base station 205 exchange data through a link between the vehicular access point 203 and the macro base station 205.

Because the macro base station 205 may manage the context with respect to the corresponding vehicular user equipment 201 during an operation of exchanging data, the macro base station 205 may perform a paging through the vehicular access point 203. For example, the vehicular user equipment 201 may receive a voice call, a short message service (SMS), and the like, while the exchange of data occurs.

Figure 3:
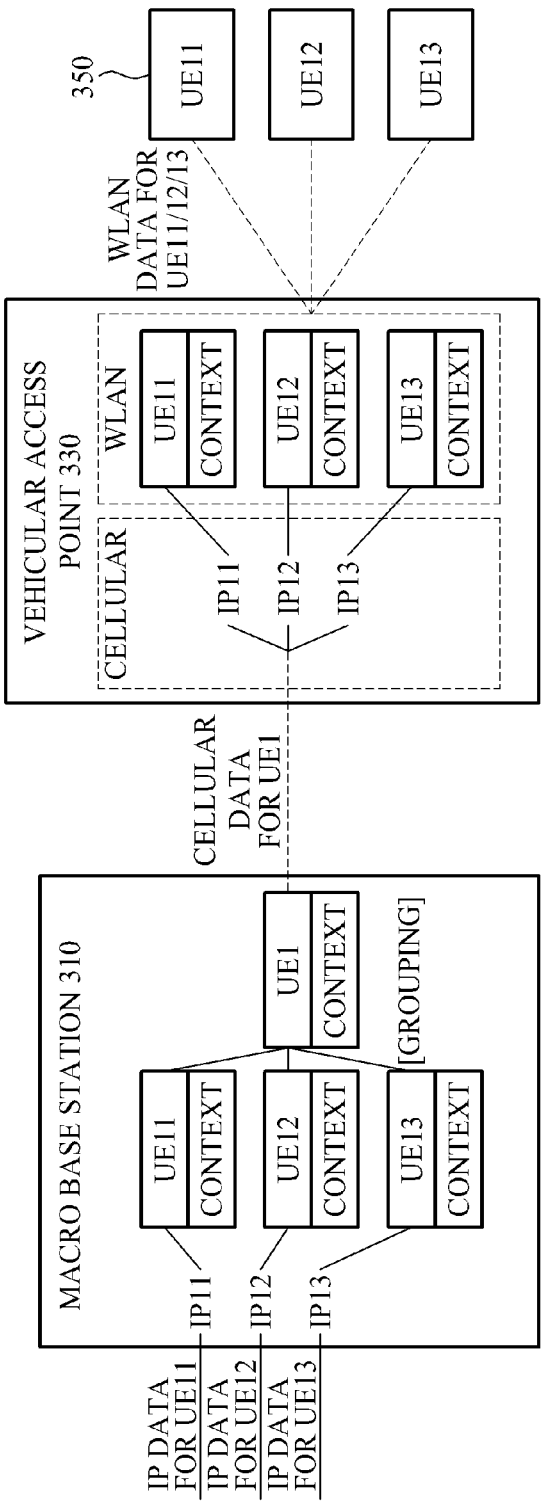
FIG. 3 is a diagram illustrating an example of a scheme of managing context of a vehicular user equipment in a macro base station.

FIG. 3 illustrates an example of a scheme of managing context of a vehicular user equipment in a macro base station. In this example, an internal wireless access device of a vehicular access point is different from a cellular system.

For convenience of description, vehicular user equipment 350 is illustrated as vehicular user equipments (UE11, UE12, and UE13) 350 in FIG. 3, however, the vehicle user equipment is not limited thereto.

Referring to FIG. 3, a macro base station 310 may form a logical connection with each of the vehicular user equipments (UE11, UE12, and UE13) 350, and may perform a paging through a vehicular access point 330.

The macro base station 310 may register the context with respect to each of the vehicular user equipments (UE11, UE12, and UE13) 350. Accordingly, macro base station 310 may perform a rapid handover based on the registered context.

Figure 4:
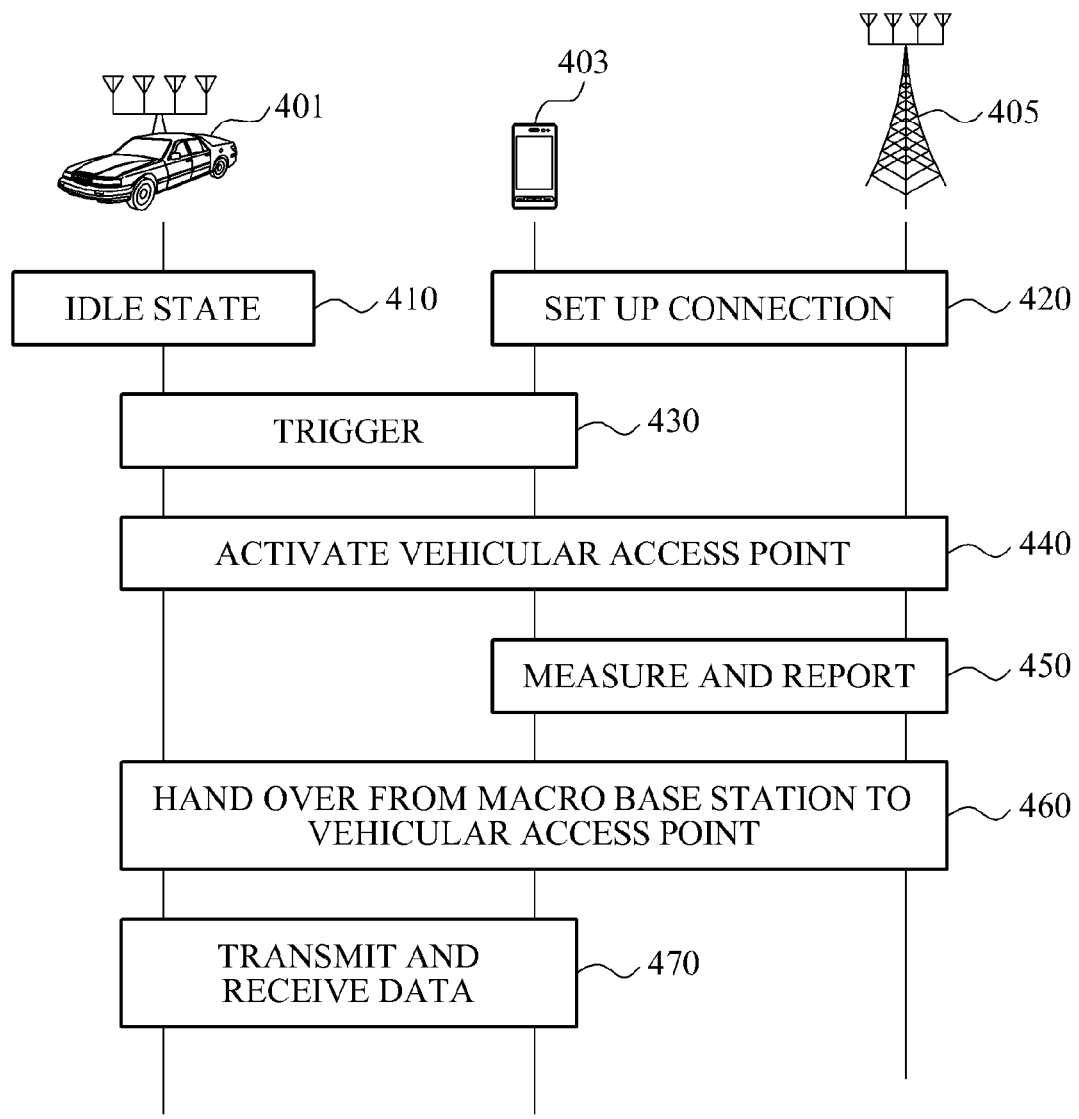
FIG. 4 is a diagram illustrating an example of a scheme for activating a vehicular access point.

FIG. 4 illustrates an example of a scheme for activating a vehicular access point.

When the number of vehicular access points 401 increases, a macro base station 405 may manage a mobility with respect to a plurality of vehicular access points 401. In this example, a vehicular access point 401 that does not have or that is not serving a vehicular user equipment 403 in an active state during a data communication in a vehicle may exist. Because the vehicular access point 401 may attempt a handover to a new macro base station 405 each time a macro cell changes due to a movement, a wireless network may be heavily loaded.

For example, to reduce a load on the wireless network, and to reduce interference caused by control information broadcasted by the vehicular access point 401 at frequent intervals, the vehicular access point 401 that does not have a vehicular user equipment 403 in the active state may be transitioned from the active state to an idle state.

The vehicular access point 401 that is in the active state may maintain a link between the vehicular access point 401 and the macro base station 405 of the macro cell, and may perform a handover between cells.

The vehicular access point 401 in the idle state may not maintain a link and may release the link between the vehicular access point 401 and the macro base station 405 of the macro cell, and may manage a routing or a paging zone, or may be switched to a completely off state.

Hereinafter, a switching operation between the active state and the idle state of the vehicular access point 401 is described.

Referring to FIG. 4, when the vehicular user equipment 403 in the corresponding vehicle uses the data communication during the idle state of the vehicular access point 401 in 410, a delayed time with respect to an initial access may occur in the vehicular user equipment 403. Thus, the vehicular user equipment 403 accesses the macro base station 405 first to set up a connection, in 420, and may determine that the vehicular user equipment 403 is included in a service region of the vehicular access point 401.

Thereafter, the vehicular user equipment 403 is triggered with respect to the vehicular access point 401 so that the vehicular user equipment 403 may be provided with a service by activating the vehicular access point 401, in 430.

In this example, the triggering may correspond to an operation that enables the vehicular user equipment 403 to recognize whether the corresponding vehicle is capable of providing a service by the vehicular access point 401, when the vehicular user equipment 403 is present in the vehicle. For example, the vehicular user equipment 403 may recognize, by the triggering, whether the service is capable of being provided by the vehicular access point 401.

In 440, the vehicular access point 401, the vehicular user equipment 403, and the macro base station 405 may perform each operation for activating the vehicular access point 401 according to the triggering.

In this example, prior to activating the vehicular access point 401 in the idle state, an activity of the vehicular user equipment 403 present in the vehicle may be detected to verify whether the activation of the vehicular access point 401 should be performed.

For example, the operation of activating the vehicular access point 401 may be divided into a scheme based on the initial access of the vehicular access point 401 and a scheme based on the paging of the vehicular access point 401.

The scheme based on the initial access of the vehicular access point 401 is described with reference to FIG. 5, and the scheme based on the paging of the vehicular access point 401 is described with reference to FIG. 6.

In 450, the vehicular user equipment 403 measures various types of information based on a result of the activation of the vehicular access point 401, and reports a measurement result to the macro base station 405.

In 460, the macro base station 405 hands over the corresponding vehicular user equipment 403 to the vehicular access point 401.

In 470, as a result of the handover, the vehicular user equipment 403 may exchange data with the vehicular access point 401.

Figure 5:
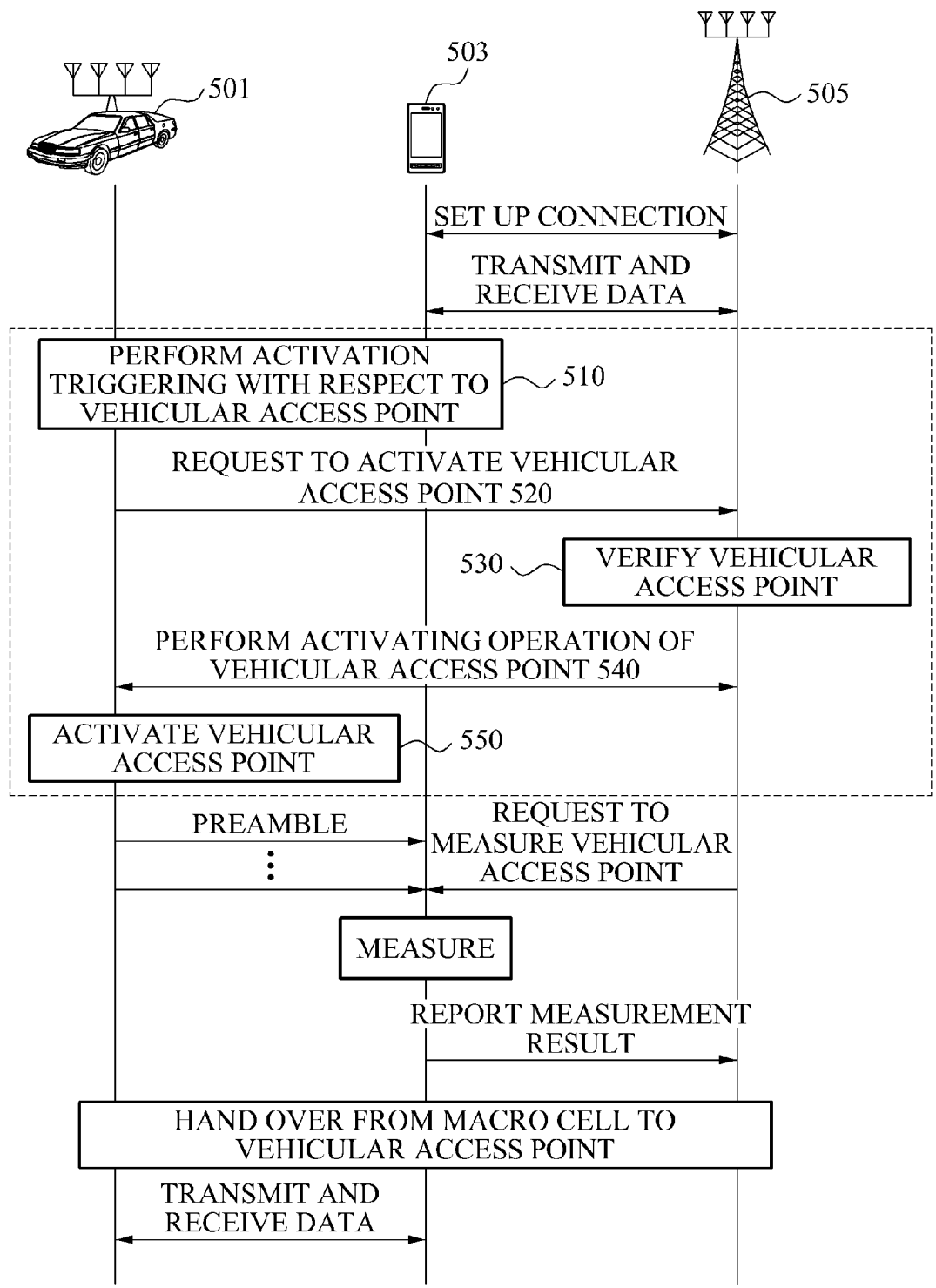
FIG. 5 is a diagram illustrating another example of a scheme for activating a vehicular access point.

FIG. 5 illustrates another example of a scheme for activating a vehicular access point.

Referring to FIG. 5, a network for performing a triggering based on an initial access of a vehicular access point includes a vehicular access point 501, a vehicular user equipment 503, and a macro base station 505.

In this example, the vehicular user equipment 503 is incapable of accessing the vehicular access point 501 when the vehicular user equipment 503 requests a wireless connection set-up. The vehicular user equipment 503 may perform a connection set-up with the macro base station 505, and may transmit and receive data.

In 510, the vehicular user equipment 503 performs, with the vehicular access point 501, an activation triggering with respect to the vehicular access point 501. As described above for FIG. 4, the triggering may correspond to an operation for the vehicular user equipment 403 to recognize whether the corresponding vehicle is capable of providing a service by the vehicular access point 401. Examples of performing the triggering are described with reference to FIG. 7 through FIG. 11.

The vehicular access point 501 may recognize activation of the vehicular access point 501 by a related operation that is performed with the vehicular user equipment 503. The vehicular access point 501 may perform an activating operation, for example, the vehicular access point 501 may transition to an active state when the vehicular access point 501 recognizes the vehicular user equipment 503.

When the vehicular user equipment 503 recognizes activation of the vehicular access point 501 is to be performed, the vehicular user equipment 503 may transmit an upstream signal to the vehicular access point 501 to induce the vehicular access point 501 to transition to the active state. The upstream signal may be, for example, a random access signal present in the vehicular access point 501.

The vehicular access point 501 may activate the vehicular access point 501 based on the triggering.

In 520, the vehicular access point 501 transmits a signal, requesting the activation of the vehicular access point 501, to the macro base station 505, based on the initial access.

The macro base station 505 verifies whether the activation of the corresponding vehicular access point 501 is possible, in 530, and performs the activating operation of the corresponding vehicular access point 501, in 540.

In 550, the vehicular access point 501 activates the corresponding vehicular access point 501 based on a signal received from the macro base station 505 verifying whether the activation is possible.

When the vehicular access point 501 is activated, functions of a wireless backhaul of the corresponding vehicular access point 501 and a wireless access of the corresponding vehicular access point 501 may be activated.

The activated vehicular access point 501 may broadcast a preamble for wireless access of the vehicular user equipment 503, and the corresponding vehicular user equipment 503 may perform a general handover procedure based on the preamble.

Figure 6:
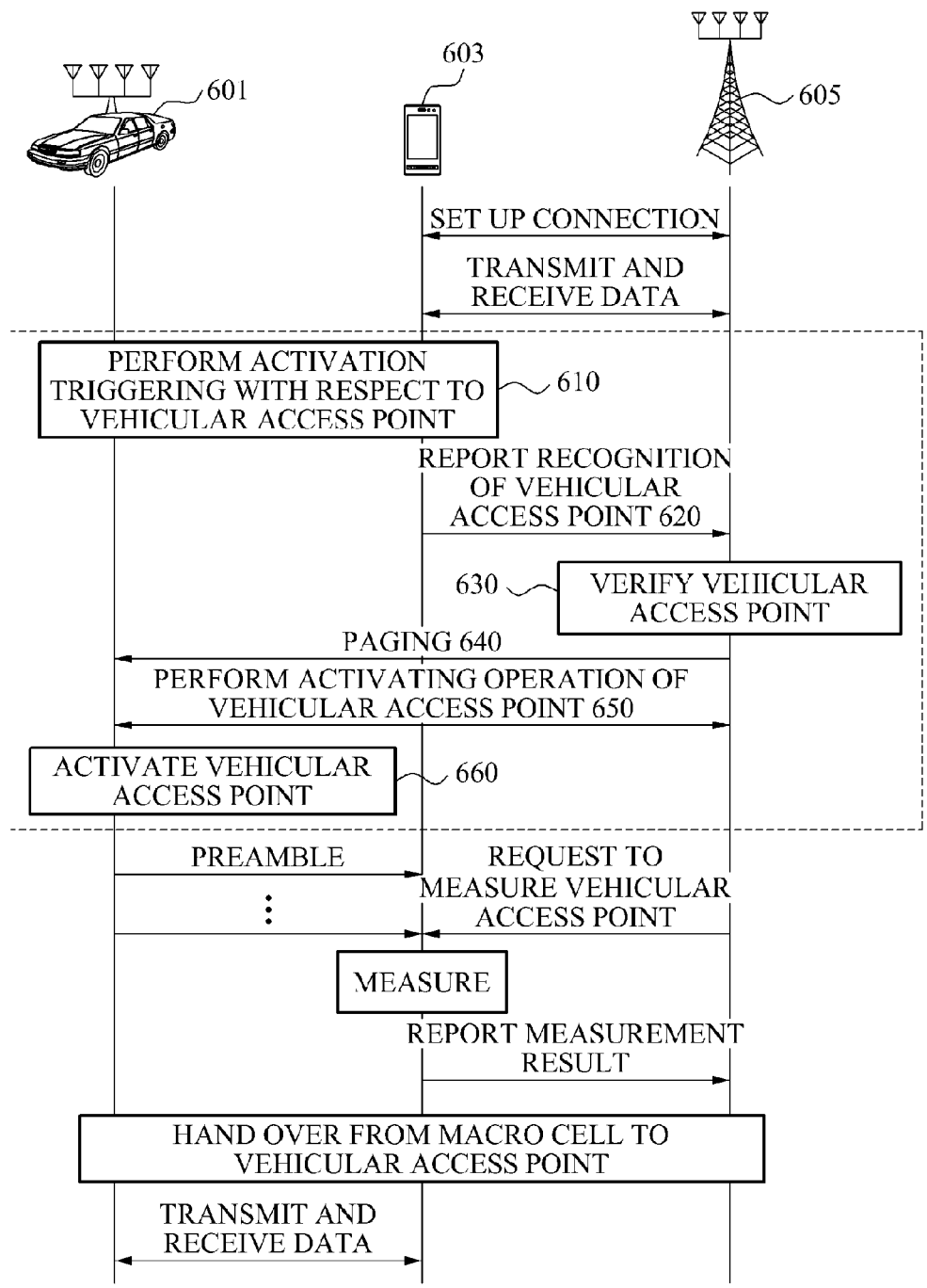
FIG. 6 is a diagram illustrating another example of a scheme for activating a vehicular access point.

FIG. 6 illustrates another example of a scheme for activating a vehicular access point.

Referring to FIG. 6, a network for performing triggering based on the paging of a vehicular access point includes a vehicular access point 601, a vehicular user equipment 603, and a macro base station 605.

If the vehicular user equipment 603 is not capable of accessing the vehicular access point 601 when the vehicular user equipment 603 requests a wireless connection set-up, the vehicular user equipment 603 may perform a connection set-up with the macro base station 605, and may transmit and receive data.

In 610, the vehicular user equipment 603 performs an activation triggering with respect to the vehicular access point 601.

For example, the vehicular user equipment 603 may recognize activation of the vehicular access point 601 is to be performed by a mutual operation between the vehicular access point 601 and the vehicular user equipment 603 associated with the activation triggering. Further schemes of performing the triggering are described with reference to FIG. 7 through FIG. 11.

After performing the triggering, the vehicular user equipment 603 reports, to the macro base station 605, information about whether the vehicular access point 601 exists and information associated with a recognition of the vehicular access point 601, in 620.

The macro base station 605 may distinguish the corresponding vehicular access point 601 using the information associated with the recognition of the vehicular access point 601.

In 630, the macro base station 605 verifies the corresponding vehicular access point 601 based on the information associated with the recognition of the vehicular access point 601. For example, the information associated with the recognition of the vehicular access point 601 may be reported from the vehicular access point 601.

After verifying the vehicular access point 601, the macro base station 605 performs a paging with respect to the corresponding vehicular access point 601, in 640.

For example, the paging may be a function of locating a corresponding mobile radio station in a case of an occurrence of an incoming call in a mobile communication. The mobile radio station may correspond to, for example, the vehicular access point 601, a base station, a switch center, and the like.

After the paging, the vehicular access point 601 activates the wireless backhaul and wireless access function in operation 650 and 660.

The activated vehicular access point 601 may broadcast a preamble for a wireless access of the vehicular user equipment 603, and the corresponding vehicular user equipment 603 may perform a handover procedure based on the preamble.

Figure 7:
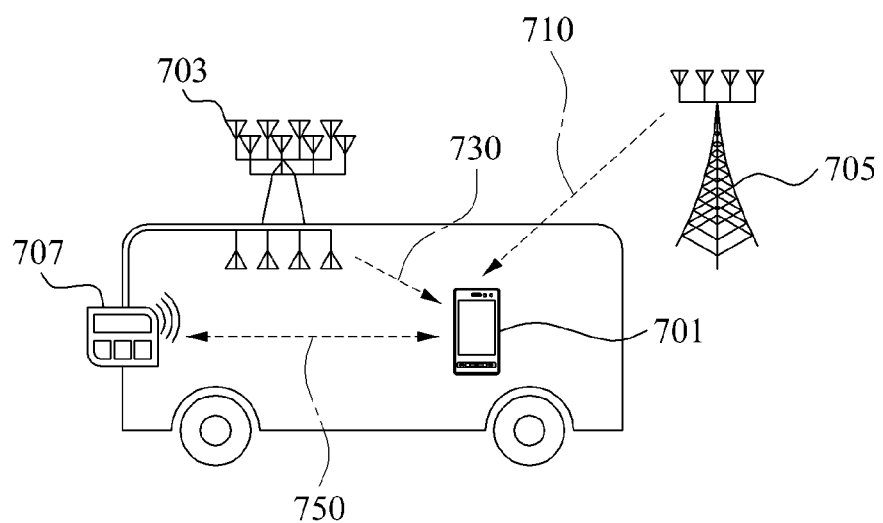
FIG. 7 is a diagram illustrating an example of links and a signal used for activation triggering of a vehicular access point.

FIG. 7 illustrates an example of links and a signal used for activation triggering of a vehicular access point.

Referring to FIG. 7, at least one of a first link 710 between a macro base station 705 and a vehicular user equipment 701, a second link 730 between the vehicular access point 703 and the vehicular user equipment 701, and a signal 750 of a third wireless access device 707 connected to the vehicular user equipment 701 may be used for the activation triggering of the vehicular access point 703.

For example, a cellular signal may be used in the first link 710 between the vehicular user equipment 701 and the macro base station 705. If the activation triggering of the vehicular access point 703 is performed using the first link 710, the vehicular user equipment 701 may receive only a signal of the macro base station 705. An example of performing the activation triggering of the vehicular access point 703 using the first link 710 is described with reference to FIGS. 8A, 8B, and 9.

As a non-limiting example, a WLAN signal, the cellular signal, and the like, may be used in the second link 730 between the vehicular access point 703 and the vehicular user equipment 701. If the activation triggering of the vehicular access point 703 is performed using the second link 730, the vehicular access point 703 may perform the triggering by a function of the vehicular access point 703. For example, the vehicular access point 703 may perform the triggering event by a protocol having a simple structure. An example of performing the activation triggering of the vehicular access point 703 using the second link 730 is described with reference to FIG. 10.

For example, a Bluetooth signal or another sensor signal may correspond to the signal 750 of the third wireless access device 707 connected to the vehicular user equipment 701.

When the third wireless access device 707 is used, the vehicular access point 703 may be recognized without going through a complex procedure. An example of performing the activation triggering of the vehicular access point 703 using the signal 750 of the third to wireless access device 707 is described with reference to FIG. 11.

Figure 8A:
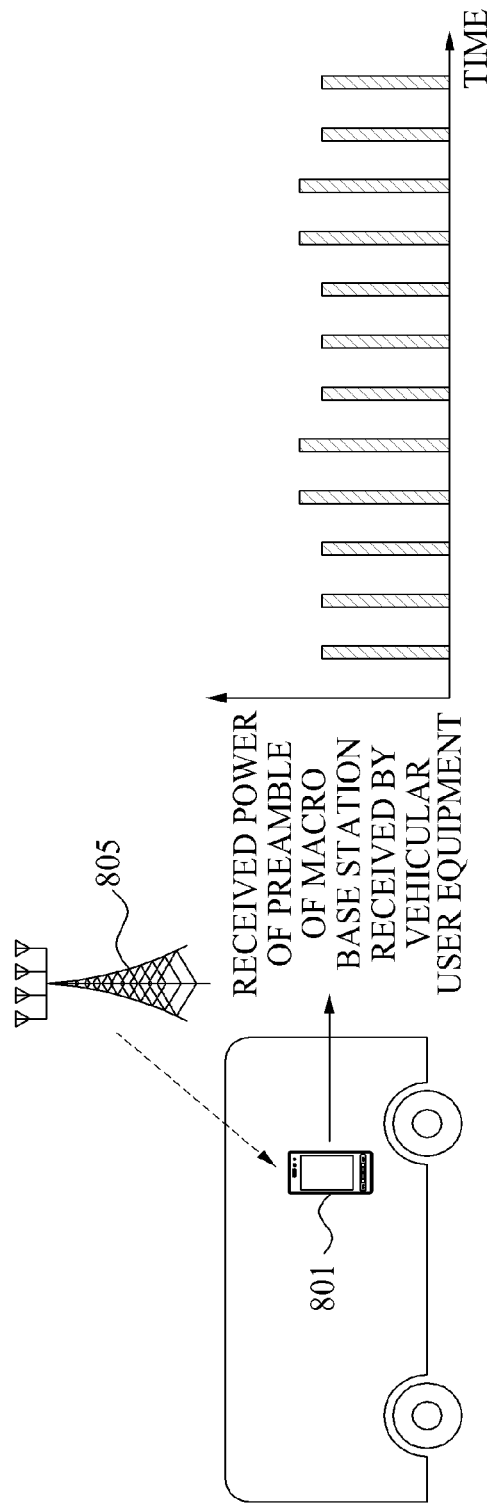
FIGS. 8A and 8B are diagrams illustrating examples of schemes for performing activation triggering of a vehicular access point using a link between a macro base station and a vehicular user equipment.
Figure 8B:
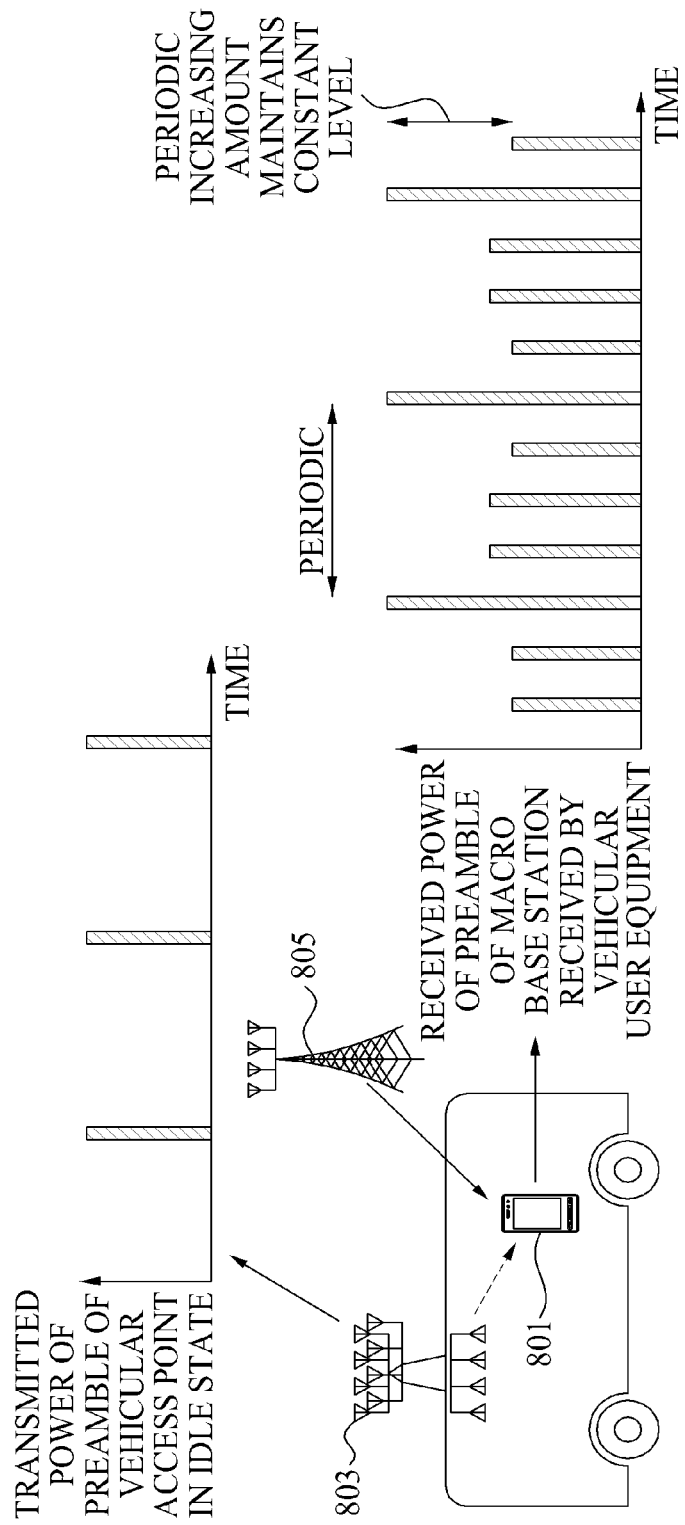

FIGS. 8A and 8B illustrate examples of a scheme for performing activation triggering of a vehicular access point using a link between a macro base station and a vehicular user equipment.

A graph in FIG. 8A indicates a received power of a preamble of a macro base station 805 received by a vehicular user equipment 801 located in a vehicle excluding a vehicular access point.

A graph on the top side of FIG. 8B indicates a transmitted power of the preamble of the vehicular access point 803 in an idle state, and a graph on the right side of FIG. 8 indicates the received power of the preamble of the macro base station 805 received by the vehicular user equipment 801 located in a vehicle that includes the vehicular access point 803 in the idle state.

The vehicular access point 803 of FIG. 8B may receive the preamble from the macro base station 805. The vehicular access point 803 may broadcast a preamble group in the idle state to the vehicular user equipment 801 in a first link. For example, the preamble group in the idle state may have an interval of an integer as a transmission period of a preamble received from the macro base station 805.

In this example, because the vehicular access point 803 may be in the idle state, the preamble group in the idle state may have a greater interval than the interval of the preamble the vehicular user equipment 801 receives from the macro base station 805. Because the vehicular access point 803 may be in the idle state, a link between the macro base station 805 and the vehicular access point 803 may be in the idle state, and other transmitting and receiving operations of the vehicular access point 803 may be in the idle state.

When the received power of the preamble, or a synch channel, received from the macro base station 805 periodically and rapidly increases as illustrated in the graph on the right side of FIG. 8B, and an increasing amount is relatively constant, the vehicular user equipment 801 present in the vehicle may determine that the vehicular user equipment 801 is present in the vehicle including the vehicular access point 803. For example, when the received power of the preamble, or the synch channel, received from the macro base station 805 is relatively constant, a relative velocity may be close to "0", that is, the vehicular user equipment 801 and the vehicular access point 803 may have the same velocity.

As another example, when the received power of the preamble, or the synch channel, received from the macro base station 805 rapidly increases or rapidly decreases, the vehicular user equipment 801 located outside of the vehicle may determine that the vehicular user equipment 801 is located outside of the vehicle, based on a change in the increasing amount.

As described above, a scheme of locating the vehicular user equipment 801 by the vehicular user equipment 801 using the received power of the preamble, or the synch channel, received from the macro base station 805 is described with reference to FIG. 9.

Figure 9:
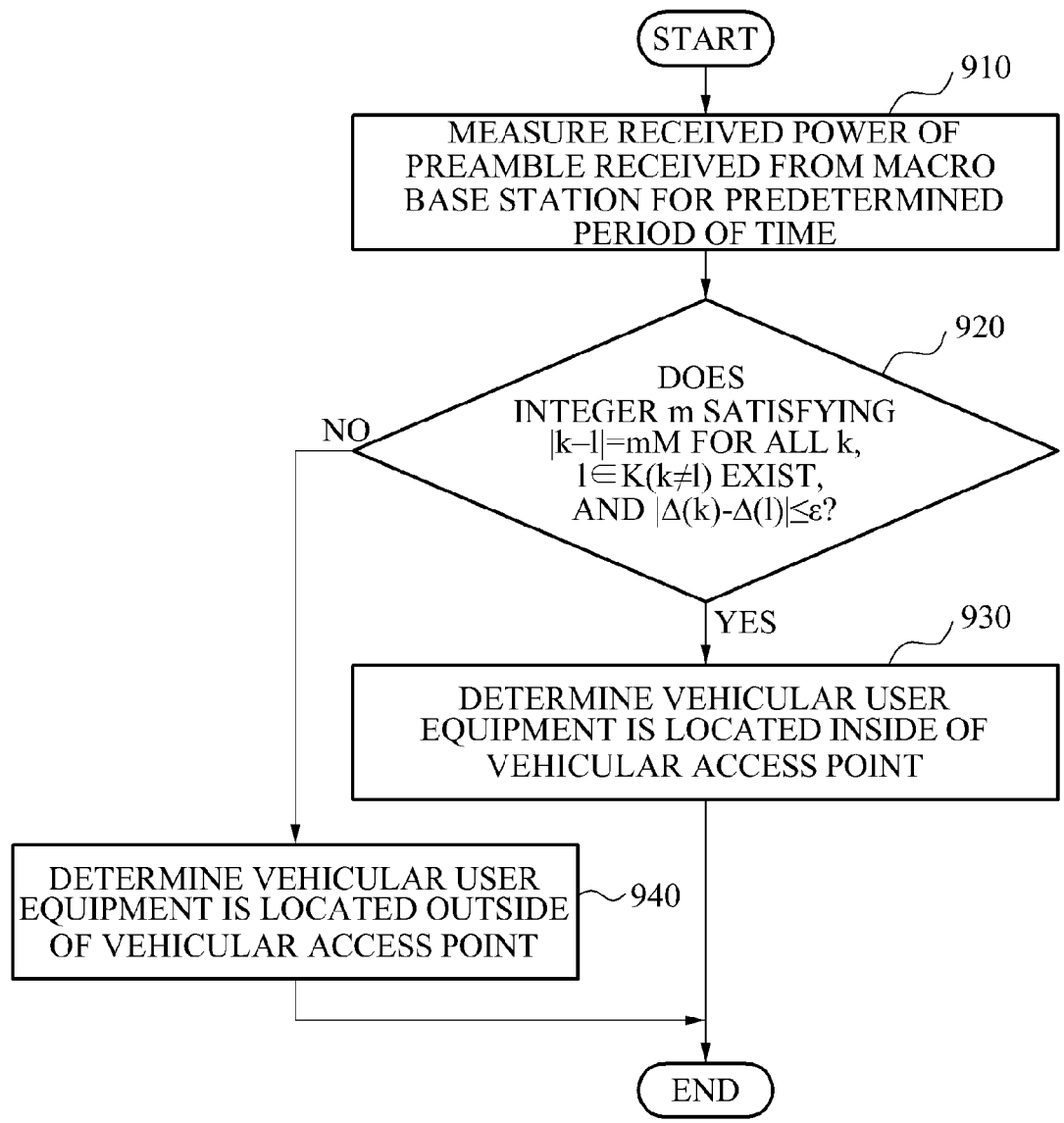
FIG. 9 is a flowchart illustrating an example of a method of locating a position using power of a preamble received from a macro base station in a link between the macro base station and a vehicular user equipment.

FIG. 9 illustrates an example of a method of locating a position using power of a preamble received from a macro base station in a link between the macro base station and a vehicular user equipment.

Referring to FIG. 9, in 910, a vehicular access point measures the received power of the preamble for a predetermined period of time to determine an interval of the preamble received from the macro base station.

In 920, the vehicular user equipment determines whether the interval of the preamble of the vehicular access point received by the vehicular user equipment corresponds to an interval of an integer of a transmission period of the preamble received from the macro base station. Also in 920, the vehicular user equipment determines whether an increasing amount of the received power of the preamble received from the macro base station is equal to or less than a predetermined level.

For example, whether the interval of the preamble of the vehicular access point received by the vehicular user equipment corresponds to the interval of an integer of a transmission period of the preamble received from the macro base station may be determined based on whether 'm' satisfies the following Equation 1.

$$|k-1|=mM, \text{ for all } k, 1 \in K(k \neq 1) \qquad \text{[Equation 1]}$$

In this example, $K=\{k|\Delta(k) \geq \alpha_1, \Delta(k+1) \geq \alpha_2\}$, and $\Delta(n)=|R(n)-R(n-1)|$ $R(n)$ indicates the received power of the preamble of the $n^{th}$ macro base station of the vehicular user equipment, M, which is a constant number in a form of a positive integer, indicates the transmitted power of the preamble of the macro base station serving the vehicular access point, and 'm' indicates an arbitrary integer.

Whether the increasing amount of the received power of the preamble received from the macro base station is equal to or less than a predetermined level may be determined based on the following Equation 2.

$$|\Delta(k)-\Delta(1)| \leq \epsilon \qquad \text{[Equation 2]}$$

In this example, $\epsilon$, which is a constant number in a form of a real number, indicates an amount of change of a periodic received power.

In 920, when the macro base station serving the vehicular access point and the macro base station serving the vehicular user equipment are the same, a preamble signal of the macro base station serving the vehicular user equipment may be used for the preamble signal received from the macro base station.

As another example, when the macro base station serving the vehicular access point and the macro base station serving the vehicular user equipment are different from each other, a preamble signal of a neighboring macro base station of the macro base station serving the vehicular user equipment may be used as the preamble signal received from the macro base station.

When the condition of 920 is satisfied, the corresponding vehicular user equipment determines that the vehicular user equipment is located in the vehicle having the vehicular access point, in 930.

When the condition of 920 is not satisfied, the corresponding vehicular user equipment determines that the vehicular user equipment is located outside of the vehicle having the vehicular access point, in 940.

Figure 10:
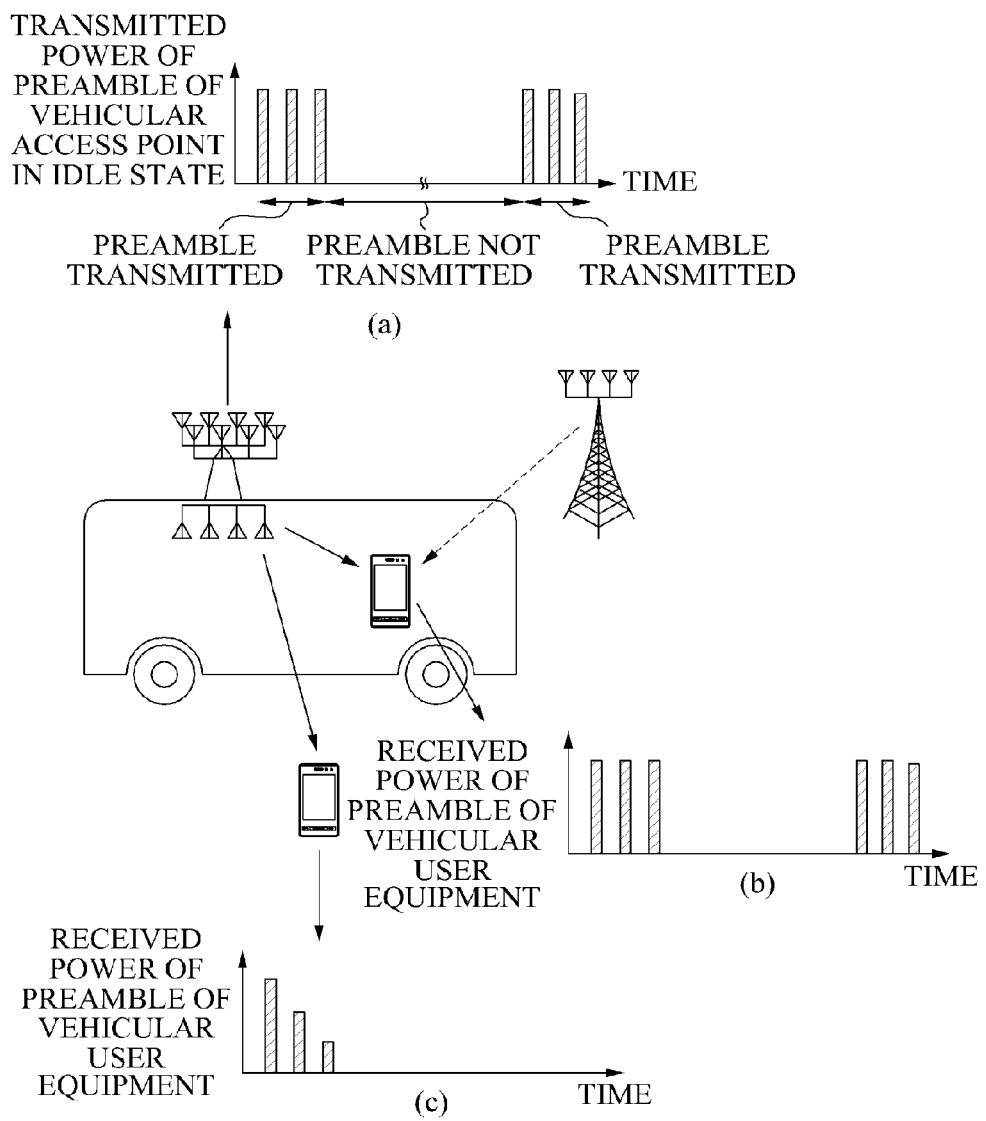
FIG. 10 is a diagram illustrating an example of a scheme for performing activation triggering of a vehicular access point using a link between the vehicular access point and a vehicular user equipment.

FIG. 10 illustrates an example of a scheme for performing activation triggering of a vehicular access point using a link between the vehicular access point and a vehicular user equipment.

Referring to FIG. 10, the vehicular access point may be triggered using information about a change in a received power of a preamble in an idle state received by the vehicular user equipment in a second link between the vehicular access point and the vehicular user equipment.

In this example, part (a) of FIG. 10 illustrates a graph indicating a transmitted power of the preamble of the vehicular access point in the idle state. For example, the transmitted power of the preamble of the vehicular access point may be broadcasted at a predetermined time that is synchronized with a macro base station. Accordingly, a time period during which the vehicular user equipment receives the preamble of the vehicular access point in the idle state may be managed.

In this example, part (b) of FIG. 10 illustrates a graph indicating a received power of the preamble that the vehicular user equipment located in the vehicle receives from the vehicular access point. For example, the vehicular user equipment located in the vehicle may receive the preamble in the idle state having a relatively constant received power due to significantly low relative velocity.

The vehicular user equipment may recognize whether the vehicular user equipment corresponds to a terminal located in the vehicle based on the change in the received power of the preamble. The vehicular user equipment may report, to a macro base station, information about whether the vehicular user equipment is located inside of the vehicle, or located outside of the vehicle. For example, the information reported to the macro base station may include information about a pattern of the corresponding preamble and a receiving time of the corresponding preamble.

The macro base station may differentiate the corresponding vehicular access point from other vehicular access points using the above information. The vehicular user equipment may directly inform the vehicular access point of the corresponding situation.

In this example, part (c) of FIG. 10 illustrates a graph indicating the received power of the preamble that the vehicular user equipment located outside of the vehicle receives from the vehicular access point. The vehicular user equipment located outside of the vehicle may determine the change in the received power of the received preamble in the idle state is significant due to a moving velocity of the vehicle.

Figure 11:
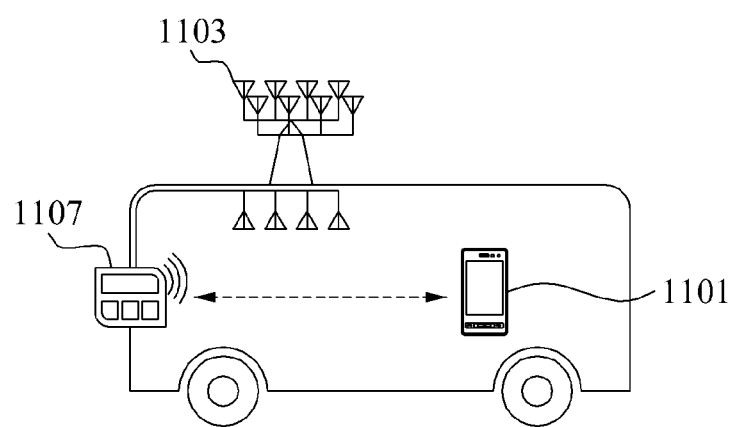
FIG. 11 is a diagram illustrating an example of a scheme for performing activation triggering of a vehicular access point using a signal of a wireless access device connected to a vehicular user equipment.

FIG. 11 illustrates an example of a scheme for performing activation triggering of a vehicular access point using a signal of a third wireless access device connected to a vehicular user equipment.

Referring to FIG. 11, vehicular user equipment 1101 may trigger a vehicular access point 1103 using a signal received from a third wireless access device 1107 connected to the vehicular access point 1103.

For example, the third wireless access device 1107 connected to the vehicular access point 1103 may periodically broadcast a beacon signal. The vehicular user equipment 1101 receiving the corresponding beacon signal may determine that the vehicular user equipment 1101 is located in a vehicle that includes the vehicular access point 1103. For example, when a magnitude of the received beacon signal is equal to or greater than a predetermined level, and an amount of change of the received power of the beacon signal is equal to or less than a predetermined level, the vehicular user equipment 1101 may determine that the vehicular user equipment 1101 is present in the vehicle that includes the vehicular access point 1103. The third wireless access device 1107 may indicate whether the vehicular access point 1103 is in an active state or in an idle state based on a pattern of the beacon signal.

The vehicular user equipment 1101 may trigger the vehicular access point 1103 using a signal transmitted to the third wireless access device 1107 connected to the vehicular access point 1103.

For example, the vehicular user equipment 1101 may broadcast a search signal with respect to the vehicular access point 1103 based on a setting by a user, periodically, or according to a manual scheme.

The third wireless access device 1107 connected to the vehicular access point 1103 receiving the search signal with respect to the vehicular access point 1103 may induce the vehicular access point 1103 to transition to the active state.

After receiving the search signal with respect to the vehicular access point 1103, the third wireless access device 1107 connected to the vehicular access point 1103 and the vehicular user equipment 1101 may perform a separate handshake operation using a corresponding wireless access scheme. For example, the third wireless access device 1107 and the vehicular user equipment 1101 may stably perform the activation triggering of the vehicular access point 1103 through the handshake operation.

Figure 12:
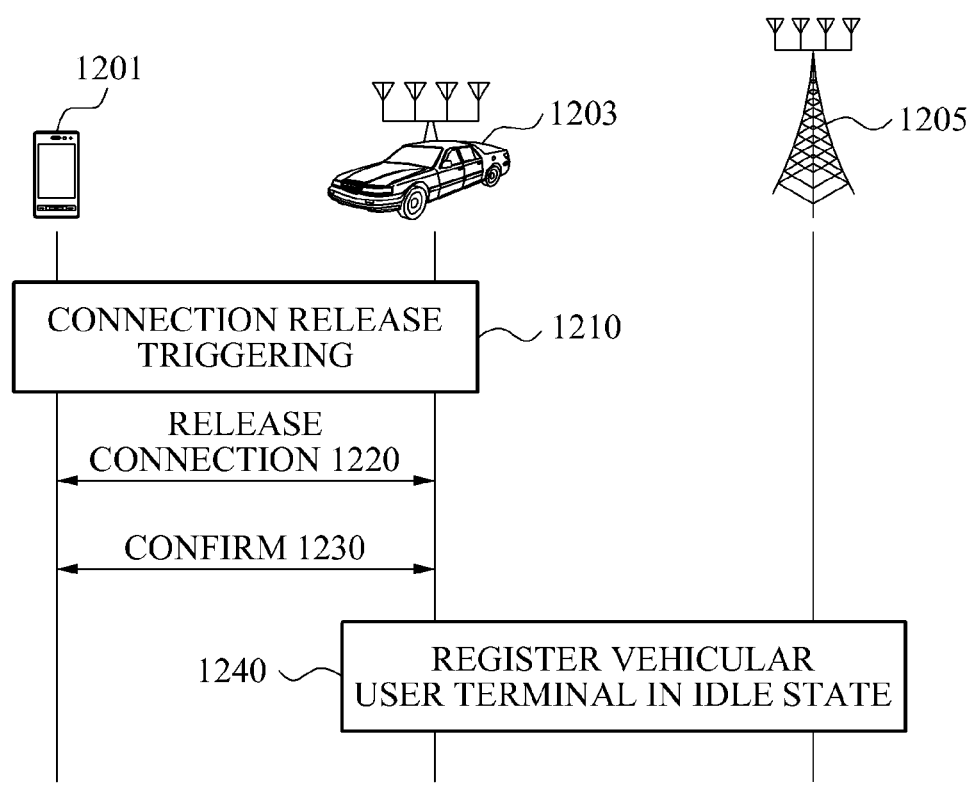
FIG. 12 is a diagram illustrating an example of a scheme in which a vehicular user equipment registers context of the vehicular user equipment in a macro base station.

FIG. 12 illustrates an example of a scheme in which a vehicular user equipment registers context of the vehicular user equipment in a macro base station. In this example, the vehicular user equipment desires to release a connection between the vehicular user equipment and a vehicular access point.

When a wireless access device inside of the vehicular access point 1203 does not correspond to a cellular system, the vehicular access point 1203 may not separately broadcast a tracking ID for a paging of the vehicular user equipment 1201 in an idle state.

For example, the tracking ID may indicate location information including a number of macro base stations for a location management of a vehicular user equipment in an idle state, and may correspond to a term defined in a long term evolution (LTE) standard.

The vehicular user equipment 1201 transitioning from the active state to the idle state may directly receive the tracking ID from the macro base station 1205. The vehicular user equipment 1201 may separately access the macro base station 1205 to report that the vehicular user equipment 1201 is in the idle state.

When the vehicular user equipment 1201 processes the above operations while the vehicular user equipment 1201 accesses the vehicular access point 1203, the operations may be greatly simplified. Hereinafter, an example in which the vehicular user equipment 1201 performs an operation of transitioning from the active state to the idle state through the vehicular access point 1203 is described.

In this example, the wireless access device present in the vehicular access point 1203 is different from the cellular system.

In 1210, when the vehicular user equipment 1201 desires to release the connection between the vehicular user equipment 1201 and the vehicular access point 1203, the vehicular user equipment 1201 performs a connection release triggering. In this example, as a result of the connection release triggering, all connection releases associated with the vehicular user equipment 1201 may be triggered.

In 1220, the vehicular access point 1203 transmits, to the vehicular user equipment 1201, information including the tracking ID to which the vehicular access point 1203 belongs, and may release the connection. For example, because a location of the vehicular access point 1203 may not be fixed due to a movement of a vehicle, the tracking ID may frequently change. When the vehicular access point 1203 does not correspond to the cellular system, a protocol enabling the tracking ID to be transmitted may be defined.

In 1230, the vehicular user equipment 1201 transmits a confirmation with respect to the connection release to the vehicular access point 1203.

In 1240, when the vehicular access point 1203 receives the confirmation with respect to the release from the vehicular user equipment 1201, the vehicular access point 1203 transmits information about the vehicular user equipment 1201 to the macro base station 1205 corresponding to the tracking ID.

The connection between the vehicular user equipment 1201 and the vehicular access point 1203 may be terminated and the cellular system may perform the location management of the vehicular user equipment 1201. Accordingly, the vehicular access point 1203 may transmit the information about the vehicular user equipment 1201 to the macro base station 1205. As described above, the vehicular access point 1203 may relay the information about the vehicular user equipment 1201 that is transitioning from the active state to the idle state to the macro base station 1205, and thus, the vehicular user equipment 1201 may reduce a protocol overhead.

Figure 13:
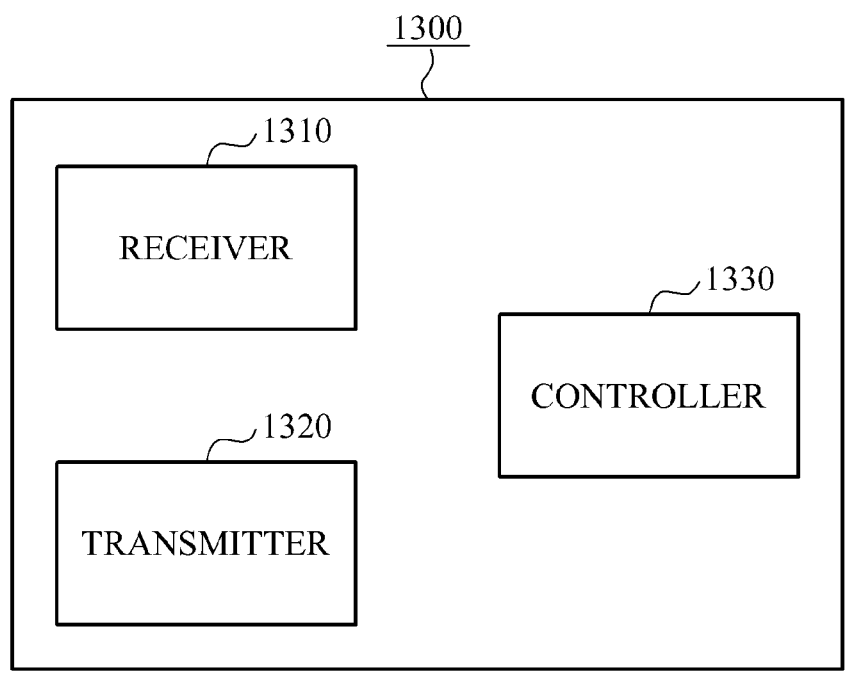
FIG. 13 is a diagram illustrating an example of a vehicular user equipment.

FIG. 13 illustrates an example of a vehicular user equipment.

Referring to FIG. 13, vehicular user equipment 1300 includes a receiver 1310 for receiving data, a transmitter 1320 for transmitting data, and a controller 1330 for controlling the vehicular user equipment 1300.

For example, the transmitter 1320 may transmit data to one or more vehicular access points and/or one or more macro base stations. For example, the receiver 1310 may receive data transmitted by one or more vehicular access points and/or one or more macro base stations. The controller may determine whether the vehicular user equipment is located within a vehicle that includes the vehicular access point based on data received from one or more macro base stations and/or from data received from one or more vehicular access points.

It should be appreciated that the examples described with reference to FIGS. 1 through 12 are applicable to the vehicular user equipment 1300 illustrated in FIG. 13. Accordingly, further description is omitted here for conciseness.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a vehicular access point, the communication method comprising:
broadcasting, to a vehicular user equipment, information about whether the vehicular access point exists, and information about at least one operational mode from among a plurality of operational modes of the vehicular access point and a macro base station; and
serving the vehicular user equipment based on the at least one operational mode,
wherein the plurality of operational modes are differentiated from each other based on an operation that the macro base station performs for the vehicular user equipment, while the vehicular access point serves the vehicular user equipment, and
a first operational mode, from among the plurality of operational modes, comprises the base station releasing a link with the vehicular user equipment while the vehicular access point exchanges data with the vehicular user equipment.

2. The communication method of claim 1, wherein:
the information about whether the vehicular access point exists includes an identifier (ID) of the vehicular access point, and
the information about the at least one operational mode corresponds to a higher order message of the information about whether the vehicular access point exists.

3. The communication method of claim 1, wherein:
the plurality of operational modes include at least one more of
a second mode in which the macro base station manages context of the vehicular user equipment while the vehicular access point exchanges data with the vehicular user equipment, a third mode in which the macro base station transmits and receives control information about the vehicular user equipment while the vehicular access point exchanges data with the vehicular user equipment, and a fourth mode in which the macro base station exchanges collaboration data with the vehicular user equipment while the vehicular access point exchanges collaboration data with the vehicular user equipment.

4. The communication method of claim 1, wherein the vehicular access point includes a first wireless access device for a link between the macro base station and the vehicular access point, and a second wireless access device for a link between the vehicular user equipment and the vehicular access point.

5. The communication method of claim 1, further comprising:

performing triggering with respect to the vehicular access point using at least one of a first link between the macro base station and the vehicular user equipment, a second link between the vehicular access point and the vehicular user equipment, and a signal of a third wireless access device connected to the vehicular user equipment; and activating the vehicular access point according to the triggering.

6. The communication method of claim 5, wherein the triggering with respect to the vehicular access point is performed using at least one of a scheme of triggering the vehicular access point by broadcasting, to the vehicular user equipment in the first link, a preamble group in an idle state at an interval of a transmission period of a preamble received from the macro base station, a scheme of triggering the vehicular access point using information about a received power variation of a preamble in the idle state received by the vehicular user equipment in the second link, and a scheme of triggering the vehicular access point using the signal of the third wireless access device connected to the vehicular user equipment.

7. The communication method of claim 5, wherein the activating with respect to the vehicular access point is performed using at least one of a first activating scheme of performing an activating operation by the vehicular access point according to a signal received from the macro base station, a second activating scheme of performing an activating operation by the vehicular access point when the vehicular access point recognizes the vehicular user equipment, and a third activating scheme of activating the vehicular access point by a paging performed by the macro base station receiving, from the vehicular user equipment, information about whether the vehicular access point exists, and information about a recognition of the vehicular access point.

8. The communication method of claim 1, wherein, when the vehicular user equipment desires to release a connection between the vehicular user equipment and the vehicular access point, the method further comprises:

transmitting, to the vehicular user equipment, information including a tracking ID to which the vehicular access point belongs; and transmitting information about the vehicular user equipment to the macro base station corresponding to the tracking ID when a verification with respect to the release is received from the vehicular user equipment.

9. A communication method of a vehicular user equipment in a vehicle, the communication method comprising:

receiving, from a vehicular access point, information about whether the vehicular access point exists, and information about at least one operational mode from among a plurality of operational modes of the vehicular access point and a macro base station;

recognizing the at least one operational mode; and operating according to the at least one operational mode, wherein the plurality of operational modes are differentiated from each other based on an operation that the macro base station performs for the vehicular user equipment, while the vehicular access point serves the vehicular user equipment, and a first operational mode, from among the plurality of operational modes, comprises the base station releasing a link with the vehicular user equipment while the vehicular access point exchanges data with the vehicular user equipment.

10. The communication method of claim 9, wherein:

the information about whether the vehicular access point exists includes an identifier (ID) of the vehicular access point, and the information about the at least one operational mode corresponds to a higher order message of the information about whether the vehicular access point exists.

11. The communication method of claim 9, wherein:

the plurality of operational modes include at least one more of a second mode in which the macro base station manages context of the vehicular user equipment while the vehicular access point exchanges data with the vehicular user equipment, a third mode in which the macro base station transmits and receives control information about the vehicular user equipment while the vehicular access point exchanges data with the vehicular user equipment, and a fourth mode in which the macro base station exchanges collaboration data with the vehicular user equipment while the vehicular access point exchanges collaboration data with the vehicular user equipment.

12. The communication method of claim 9, further comprising:

performing triggering with respect to the vehicular access point using at least one of a first link between the macro base station and the vehicular user equipment, a second link between the vehicular access point and the vehicular user equipment, and a signal of a third wireless access device connected to the vehicular user equipment; and activating the vehicular access point according to the triggering.

13. The communication method of claim 12, wherein the triggering with respect to the vehicular access point is performed using at least one of a scheme of triggering the vehicular access point by broadcasting, to the vehicular user equipment in the first link, a preamble group in an idle state at an interval of a transmission period of a preamble received from the macro base station, a scheme of triggering the vehicular access point using information about a received power variation of a preamble in the idle state received by the vehicular user equipment in the second link, and a scheme of triggering the vehicular access point using the signal of the third wireless access device connected to the vehicular user equipment.

14. The communication method of claim 12, wherein the activating performs the activating with respect to the vehicular access point by an upstream signal transmitted to the vehicular access point, or a paging of the macro base station receiving the information about whether the vehicular access point exists and information associated with a recognition of the vehicular access point.

15. A communication method of a macro base station in a vehicle, the communication method comprising:
recognizing a plurality of operational modes of a vehicular access point and the macro base station; and
operating according to the at least one operational mode when the vehicular access point broadcasts, to the vehicular user equipment, information about at least one operational mode from among the plurality of operational modes,
wherein the plurality of operational modes are differentiated from each other based on an operation that the macro base station performs for the vehicular user equipment, while the vehicular access point serves the vehicular user equipment, and
a first operational mode, from among the plurality of operational modes, comprises the base station releasing a link with the vehicular user equipment while the vehicular access point exchanges data with the vehicular user equipment.

16. The communication method of claim 15, wherein:
the plurality of operational modes include at least one more of
a second mode in which the macro base station manages context of the vehicular user equipment while the vehicular access point exchanges data with the vehicular user equipment,
a third mode in which the macro base station transmits and receives control information about the vehicular user equipment while the vehicular access point exchanges data with the vehicular user equipment, and
a fourth mode in which the macro base station exchanges collaboration data with the vehicular user equipment while the vehicular access point exchanges collaboration data with the vehicular user equipment.

17. The communication method of claim 15, further comprising:
verifying whether activation of the vehicular access point is possible by a signal received from the vehicular user equipment or the vehicular access point, after a triggering of the vehicular access point performed by the vehicular access point and the vehicular user equipment is performed; and
performing an operation for activating the vehicular access point depending on whether the activation of the vehicular access point is possible.

18. The communication method of claim 17, wherein:
the signal received from the vehicular user equipment corresponds to a signal including information about whether the vehicular access point exists and information associated with a recognition of the vehicular access point, and
the verifying whether the activation of the vehicular access point is possible includes verifying whether the activation of vehicular access point is possible using the information associated with the recognition of the vehicular access point, and performing a paging with respect to the vehicular access point.

19. The communication method of claim 15, further comprising:
when the vehicular user equipment desires to release a connection between the vehicular user equipment and the vehicular access point,
receiving information about the vehicular user equipment from the vehicular access point transmitting, to the vehicular user equipment, information including a tracking ID to which the vehicular access point belongs.

20. A non-transitory computer-readable storage medium having stored therein program instructions to cause a processor to implement a communication method, the communication method comprising:
broadcasting, to a vehicular user equipment, information about whether the vehicular access point exists, and information about at least one operational mode from among a plurality of operational modes of the vehicular access point and a macro base station; and
serving the vehicular user equipment based on the at least one operational mode,
wherein the plurality of operational modes are differentiated from each other based on an operation that the macro base station performs for the vehicular user equipment, while the vehicular access point serves the vehicular user equipment, and
a first operational mode, from among the plurality of operational modes, comprises the base station releasing a link with the vehicular user equipment while the vehicular access point exchanges data with the vehicular user equipment.

21. A vehicular user equipment for determining location, the vehicular user equipment comprising:
a receiver configured to receive a preamble signal from a macro base station that serves a vehicular access point; and
a controller configured to determine whether the vehicular user equipment is located in the vehicle that comprises the vehicular access point, based on the power of the preamble signal received from the macro base station.

22. The vehicular user equipment of claim 21, wherein if the power of the preamble signal received from the macro base station is relatively constant, the controller determines that the vehicular user equipment is present in the vehicle that comprises the vehicular access point.

23. The vehicular user equipment of claim 21, wherein if the power of the preamble signal received from the macro base station increases or decreases more than a predetermined threshold within a predetermined amount of time, the controller determines that the vehicular user equipment is not present in the vehicle that comprises the vehicular access point.

* * * * *